(12) United States Patent
Chessell

(10) Patent No.: US 6,237,018 B1
(45) Date of Patent: May 22, 2001

(54) APPARATUS METHOD AND COMPUTER PROGRAM PRODUCT FOR CLIENT/ SERVER COMPUTING WITH IMPROVED TRANSACTIONAL INTERFACE

(75) Inventor: Amanda Elizabeth Chessell, Alton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,590

(22) Filed: Dec. 3, 1998

(30) Foreign Application Priority Data

Jul. 15, 1998 (GB) ................................. 9815249

(51) Int. Cl.[7] ............................. G06F 9/00; G06F 15/16
(52) U.S. Cl. ................................. 709/101; 709/246
(58) Field of Search .................... 709/101, 328, 709/246, 203

(56) References Cited

U.S. PATENT DOCUMENTS

| | | | |
|---|---|---|---|
| 5,363,121 | * 11/1994 | Freund | 709/101 |
| 5,428,771 | * 6/1995 | Daniels et al. | 709/101 |
| 5,768,587 | * 6/1998 | Freund et al. | 709/101 |
| 5,852,732 | * 12/1998 | Freund et al. | 709/101 |
| 5,956,506 | * 9/1999 | Cobb et al. | 709/101 |

FOREIGN PATENT DOCUMENTS

| | | |
|---|---|---|
| 0707265 | 4/1996 | (EP) . |
| 2308468 | 6/1997 | (GB) . |
| 2316777 | 3/1998 | (GB) . |
| WO 98/02811 | 1/1996 | (WO) . |
| WO 96/17296 | 6/1996 | (WO) . |

OTHER PUBLICATIONS

"Spoiling for a Fight (Microsoft's Distributed Object Model vs Common Object Request Broker Architecture)", Computer Weekly, Oct. 16, 1997, p58(2), Hunter, P.

* cited by examiner

Primary Examiner—Ayaz Sheikh
Assistant Examiner—Patrice Winder
(74) Attorney, Agent, or Firm—Edward H. Duffield

(57) ABSTRACT

A non-legacy server apparatus for use in a client/server computing system for participation in a distributed transaction with a legacy server apparatus, the non-legacy server apparatus has: a non-legacy transactional application participating in a distributed transaction along with a legacy application on a legacy server apparatus; and a non-legacy transaction service which coordinates the distributed transaction and receives transactional calls from the non-legacy transactional application; wherein the non-legacy transaction service includes a mapping layer for directly mapping non-legacy based transactional calls received from the non-legacy transactional application to legacy based transactional calls for transmission to the legacy server apparatus, such that the non-legacy server apparatus does not need to include a legacy transaction service.

5 Claims, 4 Drawing Sheets

APPARATUS METHOD AND COMPUTER PROGRAM PRODUCT FOR CLIENT/SERVER COMPUTING WITH IMPROVED TRANSACTIONAL INTERFACE

FIELD OF THE INVENTION

The invention relates to the field of client/server (also known as "distributed") computing, where one computing device ("the client") requests another computing device ("the server") to perform part of the client's work. The client and server can also be both located on the same physical computing device.

BACKGROUND OF THE INVENTION

Client/server computing has become more and more important over the past few years in the information technology world. This type of distributed computing allows one machine to delegate some of its work to another machine that might be, for example, better suited to perform that work. For example, the server could be a high-powered computer running a database program managing the storage of a vast amount of data, while the client is simply a desktop personal computer (PC) which requests information from the database to use in one of its local programs.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Published Application No. EP 0 677,943 A2. These latter two publications are hereby incorporated by reference. However, an example of the basic architecture will be given below for contextual understanding of the invention's environment.

As shown in FIG. 1, the client computer 10 (which could, for example, be a personal computer having the IBM OS/2 operating system installed thereon) has an application program 40 running on its operating system ("IBM" and "OS/2" are trademarks of the International Business Machines corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS" is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic means 50 determines which object class in the framework needs to be used, and then creates an instance of that object at the server, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic means 90 during the performance of the requested tasks and when results are to be sent back to the first computer 10. The second logic means 90 establishes instances of objects, and invokes appropriate methods of those objects, as and when required by the server application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms with distributed objects as is shown in FIG. 1. The OMG has set forth published standards by which client computers (e.g. 10) communicate (in OOP form) with server machines (e.g. 20). As part of these standards, an Object Request Broker (called CORBA-the Common Object Request Broker Architecture) has been defined, which provides the object-oriented bridge between the client and the server machines. The ORB decouples the client and server applications from the object oriented implementation details, performing at least part of the work of the first and second logic means 50 and 90 as well as the connection means 80.

As part of the CORBA software structure, the OMG has set forth standards related to "transactions" and these standards are known as the OTS or Object Transaction Service. See, e.g., CORBA Object Transaction Service Specification 1.0, OMG Document 94.8.4. Computer implemented transaction processing systems are used for critical business tasks in a number of industries. A transaction defines a single unit of work that must either be fully completed or fully purged without action. For example, in the case of a bank automated teller machine from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and the actual occurrences.

Distributed transaction processing involves a transaction that affects resources at more than one physical or logical location. In the above example, a transaction affects resources managed at the local automated teller device as well as bank balances managed by a bank's main computer. Such transactions involve one particular client computer (e.g, 10) communicating with one particular server computer (e.g., 20) over a series of client requests which are processed by the server. The OMG's OTS is responsible for coordinating these distributed transactions.

Usually, an application running on a client process begins a transaction which may involve calling a plurality of different servers, each of which will initiate a server process to make changes to its local database according to the instructions contained in the transaction. The transaction finishes by either committing the transaction (and thus all servers finalize the changes to their local databases) or aborting the transaction (and thus all servers "rollback" or ignore the changes to their local databases). To communicate with the servers during the transaction (e.g., instructing them to either commit or abort their part in the transaction) one of the processes involved must maintain state data for the transaction. This usually involves the process to set up a series of transaction state objects, one of which is a Coordinator object which coordinates the transaction with respect to the various servers.

A conventional implementation of the OTS, which was developed by the International Business Machines Corporation and included in its Component Broker Series (a trademark of the IBM Corp.) product announced in May of 1997, is shown in FIG. 2. A client process 21 which wants to begin a transaction (e.g., to withdraw money from a bank account) needs to locate a process which is capable of creating and holding the transaction objects that will maintain the state of the transaction. As the modern tendency is to create clients that are "thin" (and thus have only the minimum functionality), the client process 21 will usually not be able to maintain the transaction objects locally and must look for a server process for this purpose.

According to this prior art approach, the OTS (or another service, such as the CORBA Lifecycle service) locates a server process on which to create the transaction state objects (which include the Coordinator object, Control object and Terminator object). Upon locating the server A process 22, client process 21 sends (arrow with encircled number 1) a message to server A process 22 to instruct server A process 22 to create the transaction state objects. The Control object (known in the OTS as CosTransactions::Control) provides access to the other two transaction state objects. The Terminator object (known in the OTS as CosTransactions::Terminator) is used to end the transaction. The Coordinator object (known in the OTS as CosTransactions::Coordinator) maintains a list, in local storage, of resource objects (known in the OTS as CosTransactions::Resource) that have made updates to their respective data during the transaction. This list is required so that the Coordinator object can consistently call them at the end of the transaction to commit their transactional changes (make their local data changes final) or rollback such changes (bring the local data back to the state it was in before the transaction started). A rollback would be necessary, for example, where the transaction could not finish properly because one of the resources was not working properly.

Server A process 22 then creates the transaction state objects (221) and sends a reply (arrow with encircled number 2) containing the transaction context to client 21. Client 21 then sends a debit bank account command (arrow with encircled number 3) to server B process 23 (the process containing the bank account resource object 231 which the client process 21 wishes to withdraw money from). This latter command carries with it the transaction context supplied to the client 21 by the server A process 22. In this way, the bank account resource object 231 in process 23 can register itself (arrow with encircled number 4) with the coordinator object in process 22 so that the bank account resource object 231 can be commanded (arrow with encircled number 5) to commit or rollback by the coordinator object at the end of the transaction.

In these distributed transactions, it is highly advantageous to allow a transactionally involved server process (such as server B process 23) which does not contain the transaction objects 221 to be implemented on a legacy host system, such as an IBM mainframe (MVS, VM and VSE environments), and midrange IBM AS/400 systems ("MVS", "VM", "VSE", and "AS/400", are trademarks of the IBM Corp). Many organizations already have such host systems installed and have been using them for years (hence the term "legacy"), with much mission critical applications and data stored thereon. Thus, the ability to use these legacy host systems as part of an organizations's transactions becomes very important.

However, these legacy host systems are not compatible with the non-legacy CORBA OTS. For example, the well known IBM SNA architecture defines how two different host systems can communicate with each other to carry out a distributed transaction by using what is known as synclevel 2 (syncpoint) conversations. Each host provides support for a Syncpoint Manager (SPM) defined in the IBM SNA architecture (see *Systems Network Architecture Sync Point Services Architecture Reference*, IBM document no. SC31-8134-00, First Edition (September, 1994). As shown in FIG. 3, two legacy host systems 31 and 32 are connected by an SNA network 33 and are engaged in carrying out a distributed transaction. The work is carried out by two transaction programs (TPs), one running in each server, that are communicating with one another via a SNA communications pipe 331 called a conversation. When the work is complete, one of the TPs 322 running in host server 2 (32) makes a call to its SPM 321 to request that the transaction be ended. SPM 321 then sends a request to start the commit process over the communications pipe 331 of the SNA network 33 (which is made up of pipes 331, 332 and 333) to the program 312 running in host server 1 (31), which then makes a call to its local SPM 311 which in turn sends a call to host server 2 over the same pipe 331 of the SNA network 33 in order to complete the transaction.

Thus, one of the characteristics of an SNA network is that the SPM's use the same pipe to commit/rollback the transaction. On the other hand, when two servers that are both running the CORBA OTS are involved in a distributed transaction, the servers are not limited to using any particular communication pipe. There are also many other differences which make it impossible to simply connect up two servers, one being a CORBA OTS server and the other being an SNA server to carry out a distributed transaction. Some type of transactional interface is needed.

Transarc Corporation have produced a product known as Encina PPC Gateway (described in *Encina Product Family*

Overview Version 2 Release 2, IBM document number SC331602-01, April 1996) which provides an interface which enables an SNA server to enter into a distributed transaction with Transarc's proprietary Encina Transaction Service ("Transarc", "Encina", "Encina Transaction Service" and "Encina PPC Gateway" are trademarks of the Transarc Corp. which is a wholly owned subsidiary of the IBM Corp.) As shown in FIG. 4, the Encina PPC Gateway includes the Encina Transaction Service 423, which, by itself could not enter into a distributed transaction with SNA-based host server 1 (31). In order to allow the Encina Transaction Service 423 to enter into such a transaction, the Encina PPC Gateway also includes a mapping code layer 422 in order to provide the necessary mapping between the Encina Transaction Server transactional calls and the calls which the SNA server 421 can then use to communicate over the SNA network 33 with the host server 1 (31).

The present inventor has found that a very large amount of complex mapping code and programming work is involved in creating blocks 421 and 422, especially because of the need to include the legacy transaction service 421 in the server 42. Due to such complexity, the amount of time involved in developing such an interface is far too long in terms of the quick turnaround time for developing a product in today's fast moving software market. Thus, this type of solution is inefficient and a better interface between a legacy based transaction service and a non-legacy based transaction service would be very desirable in this art.

SUMMARY OF THE INVENTION

According to a first aspect, the present invention provides a non-legacy server apparatus for use in a client/server computing system for participation in a distributed transaction with a legacy server apparatus, the non-legacy server apparatus comprising: a non-legacy transactional application participating in a distributed transaction along with a legacy application on a legacy server apparatus; and a non-legacy transaction service which coordinates the distributed transaction and receives transactional calls from the non-legacy transactional application; wherein the non-legacy transaction service includes a mapping layer for directly mapping non-legacy based transactional calls received from the non-legacy transactional application to legacy based transactional calls for transmission to the legacy server apparatus, such that the non-legacy server apparatus does not include a legacy transaction service.

Preferably, the non-legacy transaction service directly maps non-legacy based transactional calls to legacy based transactional calls by calling a resource that is registered with the non-legacy transaction service.

According to a second aspect, the invention provides a computer program product stored on a computer readable storage medium for, when run on a computer, controlling a distributed transaction in a client/server computing system, the program product having: a non-legacy transactional application participating in a distributed transaction along with a legacy application on a legacy server apparatus; and a non-legacy transaction service which coordinates the distributed transaction and receives transactional calls from the non-legacy transactional application; wherein the non-legacy transaction service includes a mapping layer for directly mapping non-legacy based transactional calls received from the non-legacy transactional application to legacy based transactional calls for transmission to the legacy server apparatus, such that the non-legacy server apparatus does not include a legacy transaction service.

Thus, the present invention eliminates the need to provide a legacy transaction service on the same server as the non-legacy transaction service, as was required in the prior art. This greatly reduces the amount of software code that must be included in the mapping layer which maps calls made to the non-legacy transaction service to the format required by the legacy transaction service.

BRIEF DESCRIPTION OF THE DRAWINGS

The invention will be better understood by the below description of preferred embodiments thereof to be read while referring to the following figures.

DETAILED DESCRIPTION OF THE PREFERRED EMBODIMENTS

Figure 1:
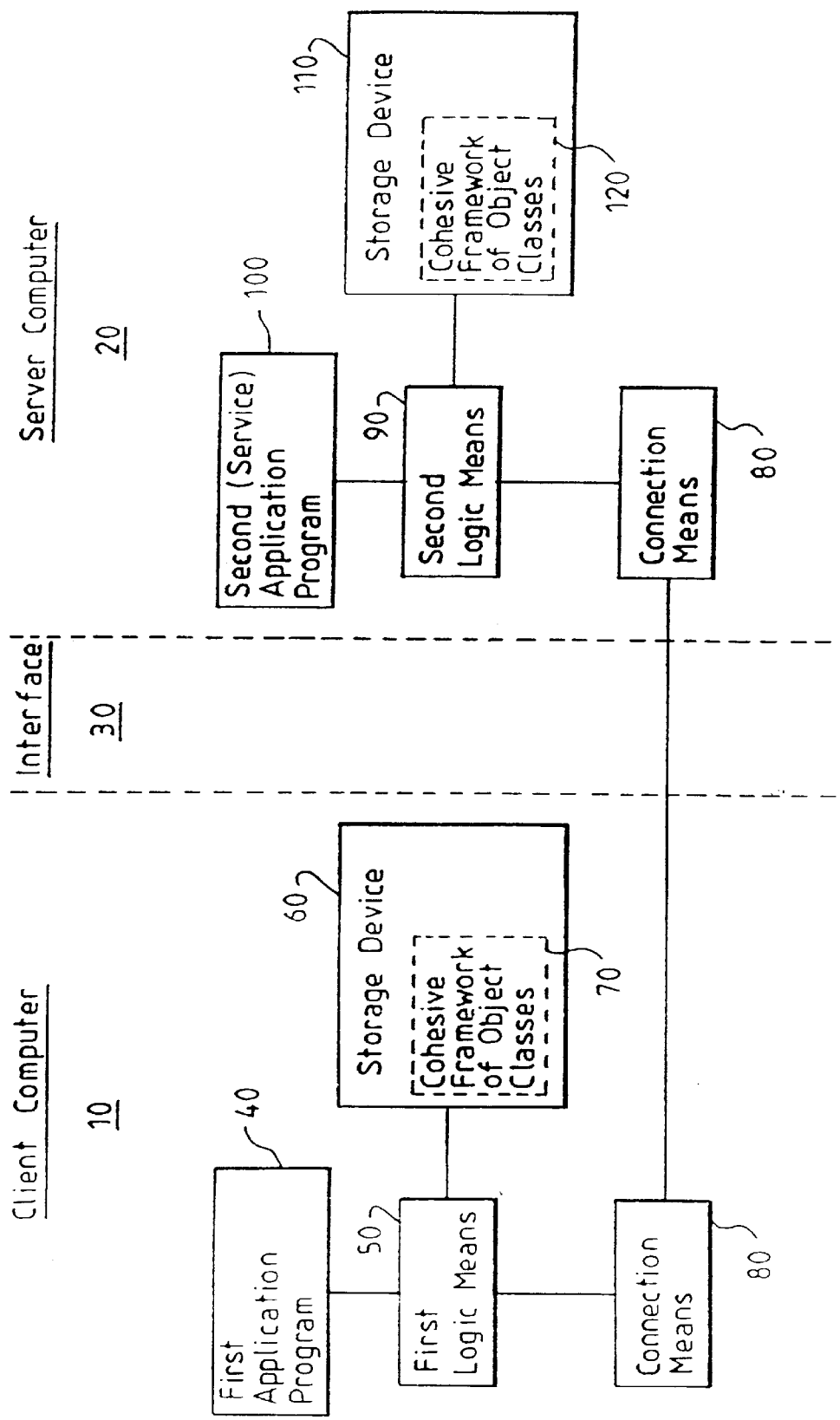
FIG. 1 is a block diagram of a well-known heterogeneous client/server architecture using object technology, in the context of which preferred embodiments of the present invention can be applied.
Figure 2:
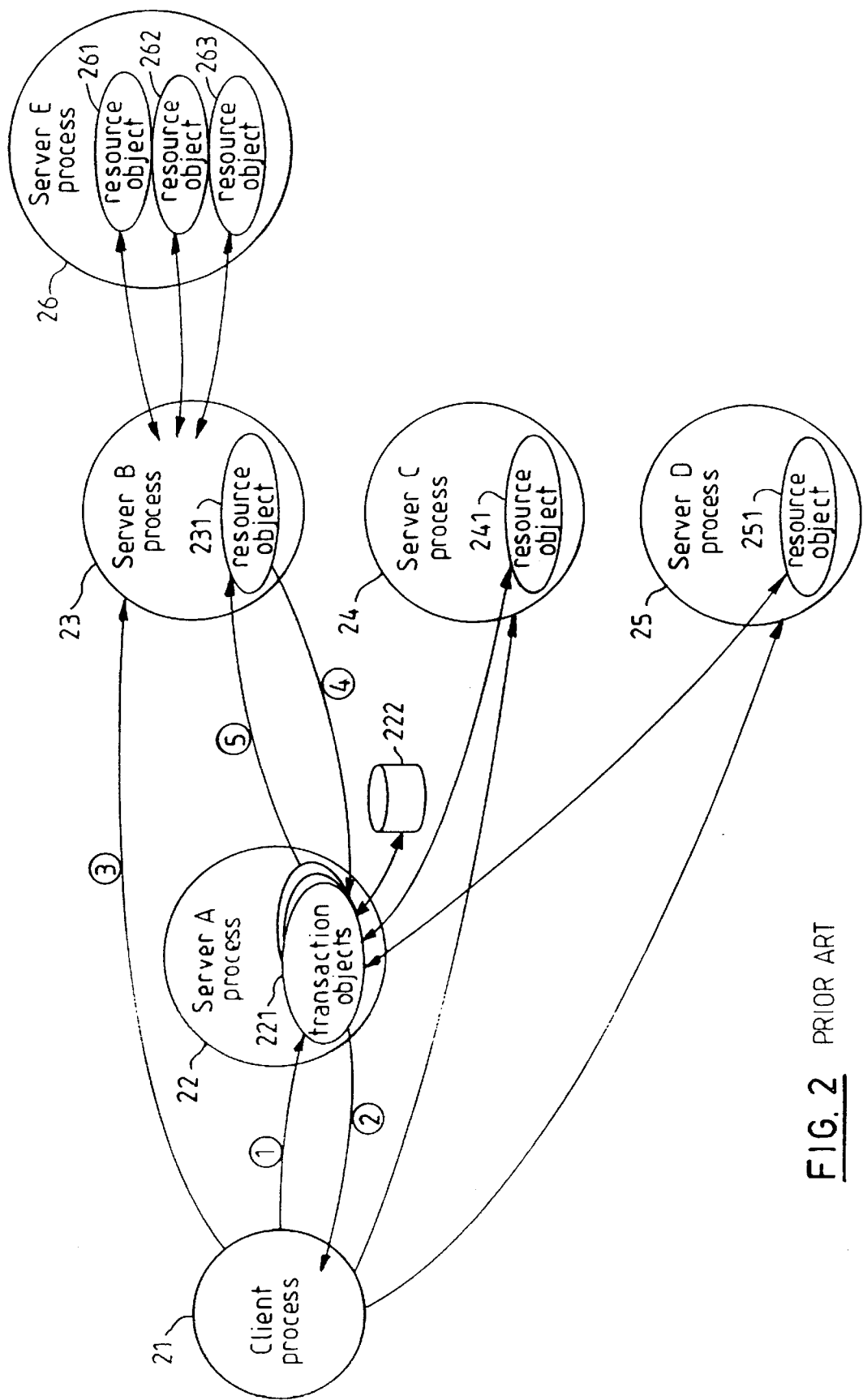
FIG. 2 is a block diagram showing a conventional OTS implementation.
Figure 3:
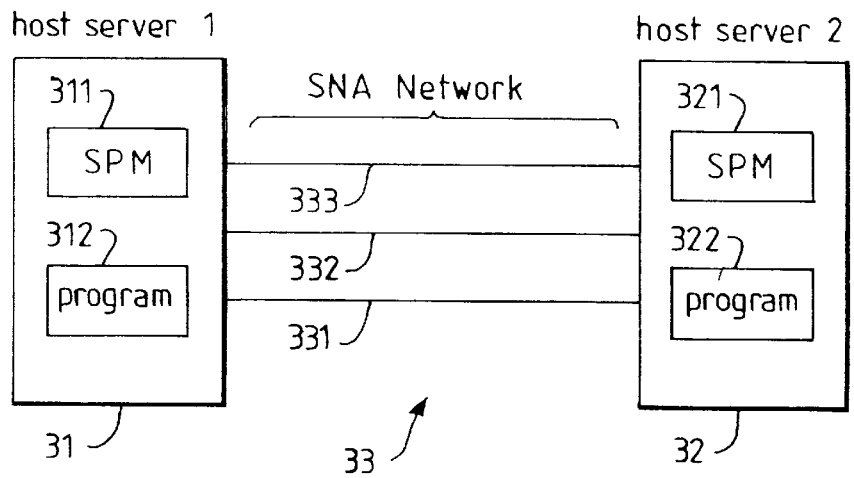
FIG. 3 is a block diagram showing a conventional SNA-based distributed transaction architecture.
Figure 4:
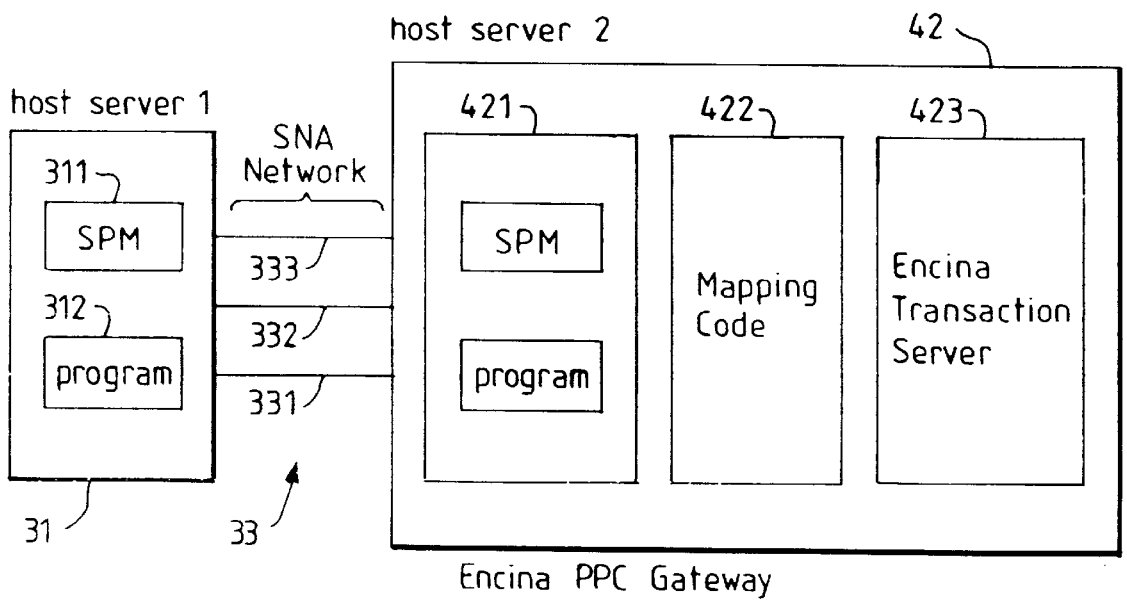
FIG. 4 is a block diagram showing a conventional Encina PPC Gateway for mapping between a non-legacy based transaction service and a legacy based transaction service.
Figure 5:
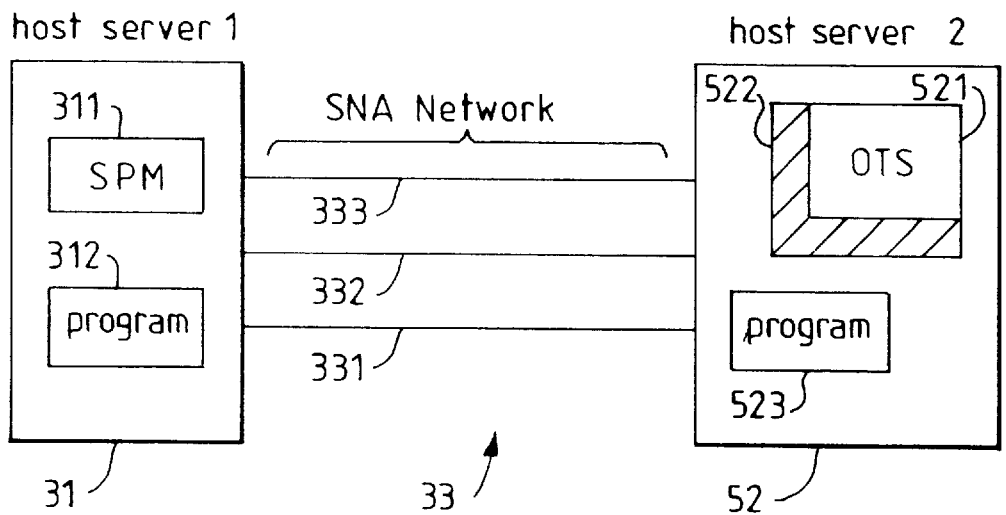
FIG. 5 is a block diagram showing a preferred embodiment of the present invention where a CORBA OTS host server contains mapping code for converting CORBA OTS transactional calls to SNA transactional calls for transmission over an SNA network.

A preferred embodiment of the present invention will now be described with reference to FIG. 5. In this preferred embodiment, a non-legacy based (e.g., CORBA OTS) host server 52's transaction service is interfaced with a legacy-based (e.g., SNA) host server 31's transaction service. Host server 31 is running a program 312 that participates in a distributed transaction by contacting the server's SPM 311. Host server 52 is running a program 523 that participates in the distributed transaction by contacting the CORBA OTS 521. Calls are then made over a single pipe 331 from program 523 in host server 52 to program 312 in host server 31. When the OTS 521 is requested to commit the transaction, the OTS 521 first calls a mapping layer 522 which converts the OTS calls directly to SPM calls for transmission over the single pipe 331 to host server 31. This, therefore, does not require a full SNA SPM implementation to be included in host server 2 (as is required in the prior art product of FIG. 4), resulting in a greatly simplified interface.

Thus, the preferred embodiment of the present invention describes a way of enhancing a CORBA OTS implementation (e.g., 521) so that it can communicate with one or more remote SNA SPMs (e.g., 311) to:

1) enable a local application (e.g., program 523) to start one or more SNA synclevel 2 conversations that each connect to a process (e.g., program 312) on a remote SNA system (e.g., host server 1). This process (e.g., 312) can then update data on its own SNA system (host server 1); and 2) when the local application (e.g., 523) calls the OTS 521 to commit or rollback the transaction, the OTS 421 can flow the correct SNA data structures to ensure the updates on the remote SNA system(s) have the same commit or rollback outcome as the local CORBA OTS transaction.

Figure 6:
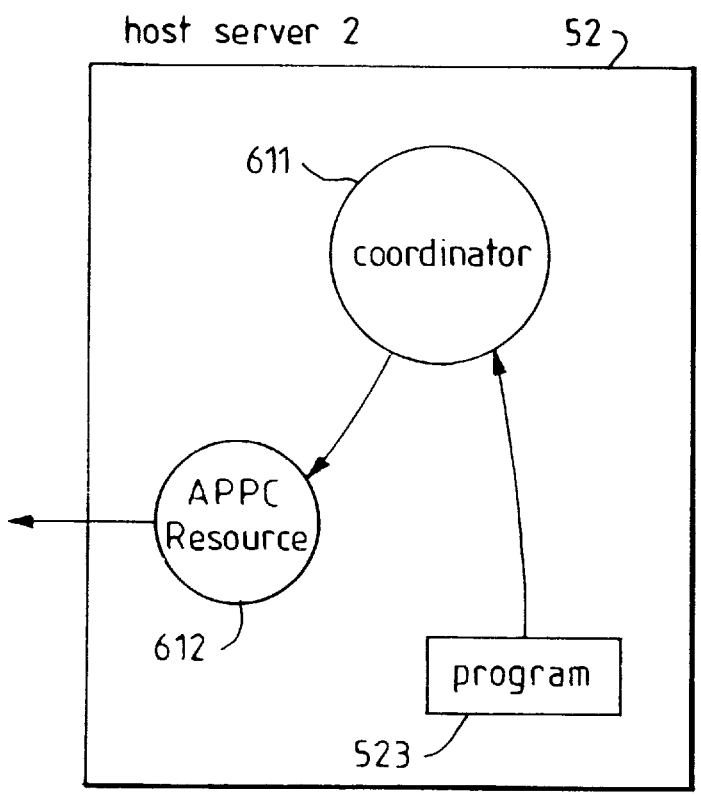
FIG. 6 is a block diagram showing more detail of the non-legacy based transaction service according to the preferred embodiment of the present invention.

The CORBA system does not need a full SNA SPM implementation in order to communicate with the remote SPM because it uses CORBA CosTransactions::Resource objects (e.g., APPC resource object 612 in FIG. 6) registered with the CORBA CosTransactions::Coordinator (e.g., 611 in FIG. 6) for a transaction to convert the commit/rollback requests made by the coordinator 611 of the transaction into a format acceptable to a SNA SPM. By doing this, much of the coordination/recovery logic required for the SNA SPM is provided by the CORBA CosTransactions::Coordinator 611. The resource object 612, in effect, represents the transactional conversation taking place between the non-legacy based server 52 and the legacy based server 31.

The SNA extension for the OTS (referred to below as OTS-APPC) uses the well-known APPC interface of a standard SNA product, such as IBM's Communication Server for NT ("Communication Server for NT" is a trademark of IBM Corp.), (which has support to enable a SPM to flow its messages) to perform all of the actual SNA network calls and management. On top of that, the OTS-APPC need only provide:

1) A sufficient SNA APPC-like interface for the local application's needs such as the ability to connect to a remote SNA system, and send/receive data;
2) Support for the SNA 0x06F2 resync transaction to exchange log names and compare transaction states with remote SNA systems. This includes receipt and processing of inbound 0x6F2 requests;
3) The ability to generate a LUWId (this is the SNA version of the OTS CosTransactions::otid_t transaction identifier) and associate it with the locally active CORBA OTS transaction.
4) The ability to add the appropriate LUWId to outgoing conversations as they are started and create a CosTransactions::Resource object for each of these conversations which is:
   registered with the OTS CosTransactions::Coordinator and
   remembers information such as the LUWId, local and partner LU names, mode name, session identifier and conversation correlator. This is saved to persistent storage in case a failure occurs and recovery/SNA resynchronization is needed to complete the transaction.
   is able to send the appropriate SNA Presentation Services (PS) headers to commit a remote SNA transaction on the local application's conversation as/when directed by the CosTransactions::Coordinator through calls to the CosTransactions::Resource methods prepare( ), commit( ), commit_one_phase( ).
   is able to send Backout Function Management Header (FMH) 7 with RQD2 and react to the response as directed by the CosTransactions::Coordinator through calls to the CosTransactions::Resource method rollback( ).
   is able to convert OTS transaction states to SNA LUW states and communicate with a remote SNA system's 0x06F2 resynchronization TPN to complete a transaction if any of the following failures that occur during commit or rollback processing.
   a failure and restart of software on the local machine
   a SNA network failure and restart
   a failure and restart of a remote SNA system. The timing of this process is also controlled through calls by the CosTransactions::Coordinator to the CosTransactions::Resource object.
5) The ability to pass APPC requests made by the application to the external SNA product such as IBM's Communication Server for NT and monitor the requests made and responses received in case a SNA error occurs which mandates that the transaction is rolled back. If one of these errors occurs, the OTS-APPC must use either of the following methods to mark the OTS transaction rollback_only. This means the correct CosTransactions::Resource method, rollback( ), is called at the end of the transaction.

CosTransactions::Current::rollback only( )
CosTransactions::Coordinator::rollback_only( )

This list of functions required by the OTS-APPC is significantly simpler than a full SNA SPM implementation.

While the preferred embodiment has been described in the context of transactionally integrating an SNA host server to a CORBA host server, this example has only been chosen for illustrative purposes. The functionality described here can be extended to enable a CORBA transaction service to control transactions in other legacy host systems which use a non-CORBA transaction service that supports external coordination (such as Transarc's Encina Transaction Service). In addition, this design may be used by other non-CORBA non-legacy transaction services, such as Microsoft Transaction Server ("Microsoft" and "Microsoft Transaction Server" are trademarks of the Microsoft Corp.) or BEA's Tuxedo ("BEA" and "Tuxedo" are trademarks of the BEA Corp.) coordinate transactions in heterogenous servers.

I claim:

1. A non-legacy server apparatus for use in a client/server computing system for participation in a distributed transaction with a legacy server apparatus, the non-legacy server apparatus comprising:
   a non-legacy transactional application participating in a distributed transaction along with a legacy application on a legacy server apparatus; and
   a non-legacy transaction service which coordinates the distributed transaction and receives transactional calls from the non-legacy transactional application;
   wherein the non-legacy transaction service includes a mapping layer for directly mapping non-legacy based transactional calls received from the non-legacy transactional application to legacy based transactional calls for transmission to the legacy server apparatus, such that the non-legacy server apparatus does not include a legacy transaction service.

2. The apparatus of claim 1 wherein the non-legacy transaction service directly maps non-legacy based transactional calls to legacy based transactional calls by calling a resource that is registered with the nonlegacy transaction service.

3. The apparatus of claim 1 wherein the non-legacy transaction service is the Common Object Request Broker Architecture Object Transaction Service (CORBA OTS).

4. The apparatus of claim 1 wherein the legacy based transactional calls are Systems Network Architecture (SNA) calls.

5. A computer program product stored on a computer readable storage medium for, when run on a computer, controlling a distributed transaction in a client/server computing system, the program product having:
   a non-legacy transactional application participating in a distributed transaction along with a legacy application on a legacy server apparatus; and a non-legacy transaction service which coordinates the distributed transaction and receives transactional calls from the non-legacy transactional application;

wherein the non-legacy transaction service includes a mapping layer for directly mapping non-legacy based transactional calls received from the non-legacy transactional application to legacy based transactional calls for transmission to the legacy server apparatus, such that a non-legacy server apparatus does not include a legacy transaction service.

* * * * *